United States Patent
Fekety et al.

(10) Patent No.: US 12,384,729 B2
(45) Date of Patent: Aug. 12, 2025

(54) INORGANIC MEMBRANE FILTRATION ARTICLES AND METHODS THEREOF

(71) Applicant: CORNING INCORPORATED, Corning, NY (US)

(72) Inventors: Curtis Robert Fekety, Corning, NY (US); Yunfeng Gu, Painted Post, NY (US); Yanxia Ann Lu, Painted Post, NY (US); Zhen Song, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 771 days.

(21) Appl. No.: 17/129,040

(22) Filed: Dec. 21, 2020

(65) Prior Publication Data

US 2021/0107838 A1    Apr. 15, 2021

Related U.S. Application Data

(63) Continuation of application No. 15/771,458, filed as application No. PCT/US2016/059074 on Oct. 27, 2016, now Pat. No. 10,870,607.

(Continued)

(51) Int. Cl.
*C04B 38/00* (2006.01)
*B01D 46/24* (2006.01)
(Continued)

(52) U.S. Cl.
CPC ...... *C04B 38/0009* (2013.01); *B01D 46/2429* (2013.01); *B01D 46/24491* (2021.08);
(Continued)

(58) Field of Classification Search
None
See application file for complete search history.

(56) References Cited

U.S. PATENT DOCUMENTS

| 3,885,977 A | 5/1975 | Lachman et al. |
| 3,954,672 A | 5/1976 | Somers et al. |

(Continued)

FOREIGN PATENT DOCUMENTS

| WO | 2007/116517 A1 | 10/2007 |
| WO | 2009/067171 A1 | 5/2009 |

(Continued)

OTHER PUBLICATIONS

Dong et al; "Preparation of Cordierite-Based Porous Ceramic Micro-Filtration Membranes Using Waste Fly Ash as the Main Raw Materials"; Journal of Membrane Science, 285, (2006) pp. 173-181 (Year: 2006).*

(Continued)

*Primary Examiner* — Magali P Slawski
*Assistant Examiner* — Bernadette Karen McGann
(74) *Attorney, Agent, or Firm* — Kevin M. Able; Russell S. Magaziner

(57) ABSTRACT

An inorganic membrane filtration article and methods for making the same. The membrane filtration article includes a sintered flow-through ceramic honeycomb with a plurality of partition walls defining a plurality of open channels from an inlet end of the honeycomb to an outlet end of the honeycomb. The honeycomb is formed from a cordierite composition with low-sodium and/or low-potassium content for enhanced filtration performance.

25 Claims, 5 Drawing Sheets

Related U.S. Application Data

(60) Provisional application No. 62/248,645, filed on Oct. 30, 2015.

(51) Int. Cl.
  *B01D 63/06* (2006.01)
  *B01D 69/02* (2006.01)
  *B01D 71/02* (2006.01)
  *C04B 35/195* (2006.01)
  *C04B 111/00* (2006.01)

(52) U.S. Cl.
  CPC ..... *B01D 46/24492* (2021.08); *B01D 46/247* (2013.01); *B01D 46/2474* (2013.01); *B01D 46/2484* (2021.08); *B01D 63/066* (2013.01); *B01D 69/02* (2013.01); *B01D 71/024* (2013.01); *C04B 35/195* (2013.01); *C04B 38/0006* (2013.01); *B01D 46/2482* (2021.08); *C04B 2111/00215* (2013.01); *C04B 2111/00793* (2013.01); *C04B 2111/00801* (2013.01); *C04B 2235/32* (2013.01); *C04B 2235/3201* (2013.01); *C04B 2235/3206* (2013.01); *C04B 2235/3208* (2013.01); *C04B 2235/3217* (2013.01); *C04B 2235/349* (2013.01); *C04B 2235/5445* (2013.01); *C04B 2235/606* (2013.01); *C04B 2235/72* (2013.01); *C04B 2235/79* (2013.01); *C04B 2235/80* (2013.01); *C04B 2235/96* (2013.01); *C04B 2235/9692* (2013.01)

(56) References Cited

U.S. PATENT DOCUMENTS

| | | |
|---|---|---|
| 5,773,103 A | 6/1998 | Ciora et al. |
| 6,458,170 B1 | 10/2002 | Visco et al. |
| 6,699,429 B2 | 3/2004 | Lu et al. |
| 8,030,164 B2 | 10/2011 | Kikkawa et al. |
| 8,389,101 B2 | 3/2013 | Merkel |
| 8,475,557 B2 | 7/2013 | Boger et al. |
| 8,497,009 B2 | 7/2013 | Noguchi et al. |
| 8,784,541 B2 | 7/2014 | Clinton et al. |
| 2005/0077226 A1 | 4/2005 | Bishop et al. |
| 2007/0261378 A1 | 11/2007 | Miao et al. |
| 2008/0057266 A1 | 3/2008 | Johnson et al. |
| 2008/0110143 A1 | 5/2008 | Chen et al. |
| 2008/0156416 A1 | 7/2008 | Choi et al. |
| 2009/0297764 A1* | 12/2009 | Beall ............... C04B 38/0006 264/43 |
| 2010/0086731 A1 | 4/2010 | Noguchi et al. |
| 2010/0126133 A1 | 5/2010 | Fekety et al. |
| 2010/0304082 A1* | 12/2010 | Merkel ............. C04B 35/195 428/116 |
| 2011/0300335 A1 | 12/2011 | Clinton et al. |
| 2012/0047860 A1* | 3/2012 | Boger ............... C04B 41/009 428/116 |
| 2014/0357476 A1 | 12/2014 | Bischof et al. |

FOREIGN PATENT DOCUMENTS

| | | |
|---|---|---|
| WO | 2011/038059 A1 | 3/2011 |
| WO | 2011/080525 A1 | 7/2011 |
| WO | 2011/149744 A1 | 12/2011 |

OTHER PUBLICATIONS

Lamar, R.S. and Warner, M.F., 1954. Reaction and Fired-Property Studies of Cordierite Compositions. Journal of the American Ceramic Society, 37(12), pp. 602-610 (Year: 1954).*

* cited by examiner

INORGANIC MEMBRANE FILTRATION ARTICLES AND METHODS THEREOF

This application is a continuation of U.S. patent application Ser. No. 15/771,458 filed on Apr. 27, 2018, which claims the benefit of priority under 35 U.S.C § 365 of International Patent Application Serial No. PCT/US2016/059074 filed on Oct. 27, 2016, designating the United States of America, which in turn claims the benefit of priority under 35 U.S.C. § 119 of U.S. Provisional Application Ser. No. 62/248,645 filed on Oct. 30, 2015, the content of which is relied upon and incorporated herein by reference in its entirety.

BACKGROUND

The present disclosure relates to membrane filtration articles and methods of making the same.

SUMMARY

According to one embodiment of the present disclosure, a membrane filtration article is disclosed. In embodiments, the membrane filtration article comprises a sintered flow-through honeycomb. In one embodiment, the honeycomb comprises a plurality of porous partition walls defining a plurality of open channels. In embodiments, the open channels may extend in an axial direction from an inlet end to an outlet end of the honeycomb. In embodiments, the plurality of partition walls include a composition, comprising: $Al_2O_3$ 32-38 wt. %; $SiO_2$ 47-53 wt. %; MgO 10-16 wt. %; $Na_2O \leq 0.10$ wt. %. In embodiments, at least 95 wt. % of the composition of the partition walls is a cordierite crystalline phase.

According to yet another embodiment of the present disclosure, a method of making a filtration article is disclosed. In embodiments, the method comprises extruding a low-sodium composition into a green body. In embodiments, the method includes sintering the green body to form a sintered flow-through honeycomb. In embodiments, the honeycomb comprises a plurality of porous partition walls which define a plurality of open channels. In embodiments, the open channels may extend in an axial direction from an inlet end to an outlet end of the honeycomb. In embodiments, the plurality of partition walls include a composition, expressed in terms of weight percent, comprising: $Al_2O_3$ 32-38 wt. %; $SiO_2$ 47-53 wt. %; MgO 10-16 wt. %; and $Na_2O \leq 0.10$ wt. %. In embodiments, at least 95 wt. % of the composition of the partition walls is a cordierite crystalline phase.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

DETAILED DESCRIPTION

Figure 1:
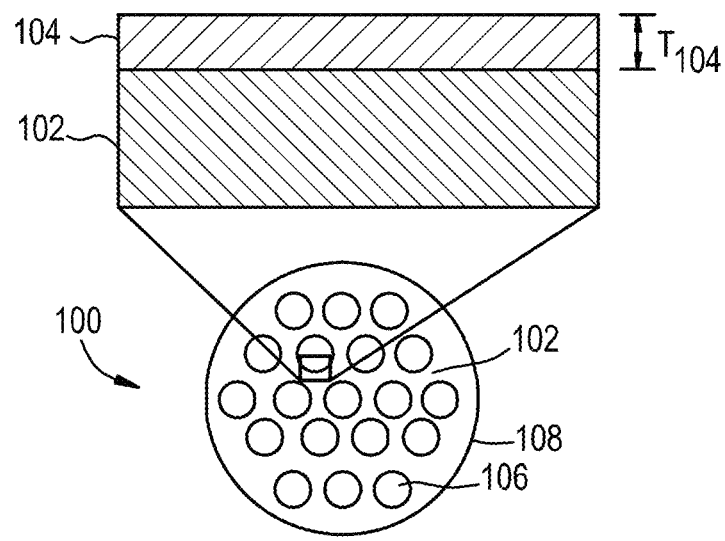
FIG. 1 is a cross-sectional, detailed end view of a membrane filtration article according to an exemplary embodiment.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

Conventional membrane filtration articles are used in numerous applications (including microfiltration applications) to filter particles (e.g., oil droplets, dust molecules, allergen particles, bacteria, etc.) from liquids (e.g., water) and gases (e.g., air). Conventional inorganic membranes have advantages over conventional organic membranes such as certain chemical and thermal stabilities, which allow conventional inorganic membranes to be used in more harsh chemical environments and in higher temperature processes as compared to organic membranes. Conventional inorganic filtration articles may include at least one open channel through the body of the article (from the feed end to the exit end) defined by porous walls. In conventional filtration processes including inorganic membrane filtration article, a feed liquid mixture or feed gas mixture to be filtered is introduced into at least one channel at the feed end of the article. As the feed mixture flows from the feed end to the exit end, fluid and small particles (e.g., ≤15 microns) pass through the porous walls as filtrate. However, larger particles (e.g., ≥15 microns) cannot pass through the porous walls and continue to the exit end. Due to the flow of these particles and other contaminates (e.g., sand), conventional filtration articles experience abrasion forces causing structural degradation of the article which can decrease filtration efficiency thereof.

Conventional inorganic filtration membranes may also become less efficient at filtering (e.g., filtrate production rate decreases) as large particles accumulate and clog or fill the pores of the membrane walls. Thus, at a certain point when efficiency of filtration is too low, conventional filtration articles require cleaning. Conventional methods of cleaning inorganic membrane filtration articles include washing with or soaking in alkaline solutions and less commonly acidic solutions to remove accumulated material and unclog the pores of membrane walls. Due to the low pH (e.g., ≤3) or high pH (e.g., ≥11) of cleaning solutions used during these treatments, portions of conventional filtration articles may corrode, decay, or even degrade. This includes spalling or removal of membrane layers on a filter substrate. Thus, alkaline or acidic treatment of conventional membrane filtration articles may lead to a reduction in filtration efficiency as walls of the article are diminished allowing passage of large particles there through. Also, for membrane filtration articles with larger median pore sizes (D50), the membrane on the substrate may spall or peel off following alkaline or acidic treatment causing complete failure of the filtration article. This is especially probable in the instance of low-cost inorganic materials such as clay, diatomite, or low purity alumina. Conventional inorganic membrane filtration articles are susceptible to these same shortcomings when used in filtration processes including high pH or low pH liquid mixtures or both.

The present disclosure provides an inorganic membrane filtration article and methods of manufacturing the same. Membrane filtration articles of the present disclosure may have increased resistance to abrasion forces during filtration operations as compared to conventional filtration articles. Membrane filtration articles of the present disclosure may also have enhanced strength or durability characteristics following high or low pH chemical treatments (or both) as compared to conventional filtration articles. Also, membrane filtration articles of the present disclosure may have improved filtration efficiencies in a subsequent use after high or low pH chemical treatments. Further, membrane filtration articles of the present disclosure may have lower firing temperatures (e.g., about 800° C. to about 1600° C.) and cheaper batch materials could lead to potentially lower cost for manufacturing.

Membrane filtration article of the present disclosure include a sintered flow-through honeycomb 100. Membrane filtration articles of the present disclosure are not organic, although may contain organic component(s) before sintering (i.e., within a green body). Sintered flow-through honeycomb 100 may be ceramic. Sintered flow-through honeycomb 100 may include a plurality of porous partition walls 102 which define a plurality of open channels 106. In embodiments, open channels 106 extend in an axial direction from an inlet end of honeycomb 100 to an outlet end of honeycomb 100. Partition walls 102 may be also be continuous from the inlet end to the outlet end of honeycomb 100.

Partition walls 102 of sintered honeycomb 100 may have a porosity from about 10% to about 90%, or from about 30% to about 70%. At least one of partition walls 102 of sintered honeycomb 100 may have a thickness from about 0.1 mm to about 3.5 mm, or from about 0.1 mm to about 1 mm, or even about 0.381 mm to about 0.889 mm. In embodiments, the plurality of partition walls 102 of sintered honeycomb 100 may have a median thickness from about 0.1 mm to about 2.5 mm. In embodiments, partition walls 102 of sintered honeycomb 100 have a pore diameter from about 0.1 microns to about 30 microns, or about 1 micron to about 15 microns, or even from about 3 microns to about 10 microns. In embodiments, partition walls 102 of sintered honeycomb 100 median pore diameter D50 may be from about 1 microns to about 10 microns, or about 2 microns to about 10 microns, or even from about 2 microns to about 8 microns.

In embodiments, open channels 106 of sintered honeycomb 100 have a diameter from about 0.5 mm to about 5 mm, or from about 1 mm to about 4 mm. Sintered honeycomb 100 may include from about 0.5 to about 31 open channels per square centimeter of the honeycomb 100 inlet end or outlet end. In embodiments, sintered honeycomb 100 may have from about 20 open channels 106 to about 1500 open channels 106 per square inch of the inlet end or outlet end (or both) of sintered honeycomb 100. The shape of open channels 106 can be, for example, at least one of: a circle, a square, a rectangle, a hexagon, or combinations thereof. FIG. 1 provides a cross-sectional, end view of flow-through ceramic honeycomb 100 according to an exemplary embodiment. Axial flow through ceramic honeycomb 100 in FIG. 1 is into the page through channels 106, while radial flow is parallel to the page and through partition walls 102 and membrane layer 104. In this depicted embodiment, open channels 106 are a plurality of circles. Of course, other open channel geometries and combinations thereof are in accordance with the present disclosure. In embodiments, a subset of open channels 106 may be plugged at one of the inlet end or the outlet end of honeycomb 100 (to form a structure resembling a diesel particulate filter) forcing flow through partition walls 102. The subset of plugged open channels 106 may be plugged by material having properties the same or similar to partition walls 102. Sintered honeycomb 100 may have a length from about 2 cm to about 121 cm, or from about 15 cm to about 31 cm. Of course larger lengths and diameters for sintered honeycomb 100 are in accordance with this disclosure.

Sintered honeycomb 100 may also include a porous skin 108 along a peripheral edge or its circumference. Skin 108 may have a thickness of about 0.1 mm to about 3.5 mm, or from about 0.5 mm to about 2.5 mm, or even from about 1 mm to about 2 mm. Skin 108 may have properties (e.g., pore diameter, pore diameter distribution, material, etc.) similar to that of partition walls 102. In alternative embodiments, skin 108 may be simply formed by converging partition walls 102.

Partition walls 102 of sintered honeycomb 100 may include or be formed from a cordierite composition with low-sodium content (e.g., $0.001 \leq Na_2O \leq 0.10$ wt. % (weight percent)). Partition walls 102 of sintered honeycomb 100 may also include or be formed from a cordierite composition having low-potassium content (e.g., $0.001 \leq K_2O \leq 0.03$ wt. %). In embodiments, partition walls 102 of sintered honeycomb 100 is formed from a cordierite composition with a low-sodium and a low-potassium content (e.g., $0.001 \leq Na_2O + K_2O \leq 0.13$ wt. %). Partition walls 102 of sintered honeycomb 100 with a low sodium or low potassium (or both low-sodium and low-potassium) content may have limited glass phases or other non-cordierite crystalline phases (e.g., <5 wt. %, or even <3 wt. %). Glass phase and non-cordierite crystalline phases may be susceptible to corrosion or deterioration when washed or treated with high or low pH mixtures (during cleaning steps) leading to possible reduction in filtration efficiency. Accordingly, the composition forming partition walls 102 of sintered honeycomb 100 may include at least 95 wt. % in the cordierite crystalline phase. In embodiments, the composition forming partition walls 102 may include 97 wt. %, or more, in the cordierite crystalline phase.

Partition walls 102 of sintered honeycomb 100 may be formed from a composition, expressed in terms of weight percent (of oxides), comprising: $Al_2O_3$ 32-38; $SiO_2$ 47-53;

MgO 10-16; and Na$_2$O 0.01-0.10. In another embodiment, partition walls 102 of sintered honeycomb 100 may be formed from a composition, expressed in terms of weight percent (of oxides), comprising: Al$_2$O$_3$ 32-38; SiO$_2$ 47-53; MgO 10-16; and K$_2$O 0.01-0.03. In yet another embodiment, partition walls 102 of fired honeycomb 100 may include, expressed in terms of weight percent (of oxides), comprising: Al$_2$O$_3$ 32-38; SiO$_2$ 47-53; MgO 10-16; Na$_2$O 0.01-0.10; and K$_2$O 0.01-0.03. Still further, partition walls 102 of fired honeycomb 100 may comprise, expressed in terms of weight percent (of oxides), comprising: Al$_2$O$_3$ 32-38; SiO$_2$ 47-53; MgO 10-16; and (Na$_2$O+K$_2$O) 0.01-0.13. The expression "(Na$_2$O+K$_2$O) 0.01-0.13", for example, designates that Na$_2$O and K$_2$O together are present in the composition in an amount from 0.01 to 0.13 wt. %.

In the embodiments provided above, the composition of partition walls 102 may also comprise, expressed in terms of weight percent (of oxides), CaO 0.01-0.15; Fe$_2$O$_3$ 0.4-1.0; NiO 0.001-0.1; and TiO$_2$ 0.01-0.5. In embodiments provided above, the composition of partition walls 102 may also comprise, expressed in terms of weight percent (of oxides), CaO 0.01-0.1; Fe$_2$O$_3$ 0.4-0.8; NiO 0.001-0.05; and TiO$_2$ 0.1-0.25.

Methods of forming membrane filtration articles of the present disclosure include extruding a low-sodium cordierite precursor composition into a green body (or substrate). Methods of forming membrane filtration articles may also include extruding a low-potassium cordierite precursor composition into a green body (or substrate). Cordierite precursor compositions may also be 3-D printed, mold injected, and other similar processes into honeycomb 100. Cordierite precursor materials may include, for example, Al$_2$O$_3$, talc, clay, SiO$_2$, and organic binder, a pore former, and a liquid carrier. Conventional organic components and pore formers used in cordierite precursor materials may include high levels of sodium (e.g., >2000 ppm) or potassium (e.g., >100 ppm), or both. The low-sodium or low-potassium cordierite precursor composition used to form the green body of the present disclosure may be realized by selecting organic components (e.g., pore formers, lubricants, binders, etc.) with low-sodium or low-potassium content. For example, low-sodium, low potassium containing pore formers include rice starch, graphite, and corn starch. Other low-sodium, low-potassium organic components may include, for example, stearic acid, methylcellulose, fatty acids, hydrocarbons, or combinations thereof.

Methods of forming membrane filtration articles of the present disclosure also includes sintering (i.e. firing) the green body including the low-sodium or low-potassium (or low-sodium and low-potassium) cordierite precursor composition to form sintered flow-through honeycomb 100. The green body sintering temperature may be between about 1000° C. and about 1700° C., or between about 1350° C. and about 1650° C. The time period of sintering may be from about 0.5 hours to about 30 hours, or from about 10 hours to about 20 hours. In exemplary methods, sintering the green body may be performed in an inert atmosphere (e.g., argon, nitrogen, etc.). In other embodiments, sintering may be performed in the presence of air.

In embodiments, sintered honeycomb 100 may also include a membrane layer 104 on at least a portion of porous partition walls 102. In other embodiments, membrane layer 104 may be on ≥50% of the surface area of the porous partition walls 102. Membrane layer 104 may also be formed on skin 108 of honeycomb 100. Membrane layer 104 may be sintered. Membrane layer 104 may have a porosity from about 30% to about 70%, or from about 40% to about 60%. In exemplary embodiments, the porosity of sintered membrane layer 104 is less than the porosity of sintered partition walls 102. In embodiments, sintered porous membrane layer 104 may have a thickness $T_{104}$ on partition walls 102 from about 1 micron to about 30 microns, or from about 5 micron to about 25 microns, or from about 10 microns to about 20 microns. Thickness $T_{104}$ may be selected for the particular filtration application for honeycomb 100 and the particle sizes to be filtered. Sintered porous membrane layer 104 may have a median thickness from about 5 microns to about 25 microns. In exemplary embodiments, sintered membrane layer 104 has pore diameter from about 0.1 microns to about 5 microns, or about 1 micron to about 4 microns. In embodiments, sintered membrane layer 104 has a median pore diameter D50 from about 0.1 microns to about 4 microns, or from about 0.1 microns to about 3 microns, or from about 0.1 micron to about 2 microns, or from about 0.2 microns to about 0.6 microns. In embodiments, the median pore diameter D50 of sintered membrane layer 104 is at least an order of magnitude less than the median pore diameter D50 of sintered partition walls 102.

At least 50 wt. % (up to 99 wt. %) of sintered membrane layer 104 may include or be formed from a cordierite composition with low-sodium content (e.g., 0.001≤Na$_2$O≤0.10 wt. %). At least 50 wt. % (up to 99%) of sintered membrane layer 104 may also include or be formed from a cordierite composition having low-potassium content (e.g., 0.001≤K$_2$O≤0.03 wt. %). In embodiments, at least 50 wt. % (up to 100 wt. %) of sintered membrane layer 104 is formed from a cordierite composition with a low-sodium and a low-potassium content (e.g., 0.01≤Na$_2$O+K$_2$O≤0.13 wt. %). Sintered membrane layer 104 with a low sodium or low potassium (or both low-sodium and low-potassium) content may have limited glass phases or other non-cordierite crystalline phases (e.g., <5 wt. %, or even <3 wt. %). Glass phase and non-cordierite crystalline phases within sintered membrane layer 104 may be susceptible to corrosion or deterioration when washed or treated with high or low pH mixtures leading to possible reduction in filtration efficiency. In embodiments, sintered membrane layer 104 has lower sodium content than partition walls 102 (e.g., ≤0.01 wt. %). The cordierite composition forming sintered membrane layer 104 may include at least 95 wt. % in the cordierite crystalline phase. In exemplary embodiments, the cordierite composition forming sintered membrane layer 104 may include 97 wt. %, or more, in the cordierite crystalline phase. Depending on the weight of honeycomb 100, sintered membrane layer 104 may be from 1 wt. % to about 30 wt. % of the weight of honeycomb 100 including sintered membrane layer 104.

Sintered membrane layer 104 may include or be formed from at least 50 wt. % of a cordierite composition, expressed in terms of weight percent (of oxides), comprising: Al$_2$O$_3$ 31-37; SiO$_2$ 45-51; MgO 10-16; and Na$_2$O 0.01-0.07. In another embodiment, sintered membrane layer 104 may include or be formed from at least 50 wt. % of a cordierite composition, expressed in terms of weight percent (of oxides), comprising: Al$_2$O$_3$ 31-37; SiO$_2$ 45-51; MgO 10-16; and K$_2$O 0.01-0.03. In yet another embodiment, sintered membrane layer 104 may include or be formed from at least 50 wt. % of a cordierite composition, expressed in terms of weight percent (of oxides), comprising: Al$_2$O$_3$ 31-37; SiO$_2$ 45-51; MgO 10-16; Na$_2$O 0.01-0.07; and K$_2$O 0.01-0.03. Still further, sintered membrane layer 104 may include or be formed from at least 50 wt. % of a cordierite composition, expressed in terms of weight percent (of oxides): Al$_2$O$_3$ 31-37; SiO$_2$ 45-51; MgO 10-16; and (Na$_2$O+K$_2$O) 0.01-0.10.

In the embodiments provided above, the cordierite composition of sintered membrane layer 104 may also include, expressed in terms of weight percent (of oxides), CaO 0.05-0.15; $Fe_2O_3$ 0.3-1.0; NiO 0.001-0.1; and $TiO_2$ 0.2-0.8. In the embodiments provided above, the cordierite composition of sintered membrane layer 104 may further include, expressed in terms of weight percent (of oxides), CaO 0.05-0.1; $Fe_2O_3$ 0.3-0.9; NiO 0.001-0.09; and $TiO_2$ 0.2-0.5.

In exemplary embodiments, sintered membrane layer 104 may also include from about 1 wt. % to about 50 wt. % alumina. The alumina may include alpha alumina, gamma alumina, rho alumina, or combinations thereof. The alumina may also be other types of high surface area alumina. In exemplary embodiments, the alumina composition and the cordierite composition discussed above are homogeneous in forming sintered membrane layer 104. Inclusion of alumina within sintered membrane layer 104 may reduce the sodium and potassium composition therein. The used of alumina may also assist in increasing the surface area of sintered membrane layer 104 and obtaining the desired pore diameter.

Honeycomb 100 including membrane layer 104 may have a water permeance through partition walls 102 and membrane layer 104 from about 100 liters/hour/m²/bar to about 5,000 liters/hour/m²/bar, or from about 300 liters/hour/m²/bar to about 3,000 liters/hour/m²/bar. In embodiments, water permeance through membrane filtration articles is pure water. In embodiments, membrane filtrations articles of the present disclosure is ≥300 liters/hour/m²/bar, or ≥500 liters/hour/m²/bar. Honeycomb 100 including membrane layer 104 may also have a pressure drop from about 1 psi to about 20 psi, or from about 2 psi to about 8 psi, under an axial flow rate from about 3 gallons per minute to about 8 gallons per minute.

Methods of forming membrane filtration articles of the present disclosure may include contacting sintered flow-through honeycomb 100 with a low-sodium cordierite precursor composition to form a green membrane layer on at least a portion of partition walls 102. Methods of forming membrane filtration articles may also include contacting sintered flow-through honeycomb 100 with a low-potassium cordierite precursor composition to form the green membrane layer on at least a portion of partition walls 102. The low-sodium or low-potassium (or both low-sodium and low-potassium) cordierite precursor composition used to form green membrane layer 104 may be a powder or a slurry applied to sintered or unsintered (i.e., green) flow-through honeycomb 100 by dip coating, spray coating, and other methods of applying a coating to a substrate. In the case of a slurry coating formulation, it may include from about 5 wt. % to about 50 wt. % solids including cordierite precursor materials, a binder, and a liquid carrier. The liquid carrier maybe an alcohol or water, and does not dissolve the flow-through honeycomb 100 (sintered or unsintered). The binder may be methylcellulose, polyvinylpyrrolidone, polyvinyl butyral, and other similar binders which are soluble in the liquid carrier. The binder may be from about 2 wt. % to about 10 wt. % based on the total weight of the solids content of the coating slurry formulation. The slurry formulation may also include a pore former in an amount from about 1 wt. % to about 60 wt. % based on the total weight of the solids content of the coating slurry formulation.

Methods of forming membrane filtration articles of the present disclosure include sintering (i.e. firing) the green membrane layer 104 on partition walls 102 of honeycomb 100 at a temperature to form sintered, porous membrane layer 104. After sintering, the organic components of the green membrane layer may be degraded making the membrane layer 104 porous. The membrane layer 104 sintering temperature may be between about 1000° C. and about 1700° C., or between about 1100° C. and about 1300° C. The time period of sintering may be from about 0.5 hours to about 30 hours, or from about 1 hour to about 5 hours. In exemplary methods, sintering the green body may be performed in an inert atmosphere (e.g., argon, nitrogen, etc.). In other embodiments, sintering may be performed in the presence of air. Heating rate during sintering and cooling rate following sintering may be from about 0.1° C. per minute to about 3° C. per minute, or from about 1° C. per minute to about 2° C. per minute.

In alternative embodiments, the low-sodium or low-potassium (or both low-sodium and low-potassium) cordierite precursor composition used to form green membrane layer 104 may be applied to the flow-through honeycomb 100 green body before sintering. That is, the green body forming honeycomb 100 and green membrane layer 104 thereon are sintered simultaneously. This may result in cost savings for sintering processes when manufacturing membrane filtration articles of the present disclosure.

The present disclosure also includes method of using the membrane filtration article. The method may include causing relative movement between a filtration apparatus having the presently disclosed membrane filtration article therein and a target fluid selected for filtration of at least one phase form another phase of the fluid. The target fluid selected for filtration can comprise, for example, a first phase comprised of a gas or a liquid and a second phase comprised of, for example, particles immiscible in the first phase (e.g., oil in water, sand in oil, metal and oil in water, organic waste in water, inorganic waste in water, bacteria in water, etc.). In embodiments, membrane filtration articles of the present disclosure may separate particulates from the target fluid with a diameter from about 0.01 microns to about 1 cm, or from about 0.1 microns to about 1 mm, or even from about 1 micron to about 10 microns. In an example where the target fluid is an oil and water emulsion, membrane filtration articles of the present disclosure may provide less than 5 mg of oil per liter of water permeate, or even less than 1 mg of oil per liter of water permeate.

Methods of using the membrane filtration article of the present disclosure may also include contacting the membrane filtration article and a target fluid. Contacting the membrane filtration article and the target fluid may separate the target fluid into a first phase and a second phase. Methods of using the membrane filtration article may also include contacting the membrane filtration article with a cleaning fluid to regenerate the fouled membrane filtration article (i.e., regenerated membrane filtration article).

Membrane filtration articles of the present disclosure may have a resistance to fluids (e.g., cleaning chemicals, process fluids, etc.) with a pH from about 3 to about 13. After using a membrane filtration article disclosed herein to contact or separate a target fluid, methods may include contacting the membrane filtration article with a cleaning fluid to regenerate the fouled membrane filtration article. In embodiments, after contacting the fouled membrane filtration article with a cleaning fluid, the fouled membrane filtration article may be regenerated to achieve >80%, or even >90% of the initial pure water permeance. That is, for example, a fouled membrane filtration article after cleaning may have a water permeance of about 1800 liters/hour/m²/bar or more where the same membrane filtration article had a water permeance of about 2000 liters/hour/m²/bar before contacting the target fluid and fouling. Of course, higher or lower water permeance values are in accordance with the present disclosure.

In embodiments, membrane filtration articles of the present disclosure have a useful lifetime from about 1 month to about 10 years, or from about 6 months to about 8 years, or from about 1 year to about 5 years. The increased lifetime of membrane filtration articles of the present disclosure as compared to conventional filtration articles may be attributed their low-sodium or low-potassium composition (or both low-sodium and low-potassium composition). This composition provides resistance to extreme pH conditions (e.g., pH 3-14) during repeated cleanings and abrasion resistance during repeated uses over time.

In embodiments, membrane filtration articles of the present disclosure have a ring-on-ring (ROR) strength from about 100 psi to about 500 psi, or from about 200 psi to about 500 psi, or even from about 300 psi to about 500 psi.

In embodiments, the ROR strength of regenerated membrane filtration articles (i.e., those previously used, fouled, and cleaned) may be within about 50%, or about 30%, or even about 10% of the ROR strength of the same membrane filtration article before contacting the target fluid and fouling.

EXAMPLES

The membrane filtration articles of the present disclosure will be further clarified with reference to the following examples. The following examples should be construed as illustrative and in no way limiting as to the present disclosure.

Example 1: Formation of Four Ceramic Honeycombs

Four green bodies were prepared using the batch composition as provided in Table 1 below. Green bodies 1 and 2 were prepared as example embodiments of the present disclosure. Green bodies 3 and 4 were conventional green bodies prepared as comparative examples. The materials in the batch composition for each of the four green bodies shown in Table 1 are provided in super addition notation to clearly indicate the weight percent of the inorganic components remaining in the resultant cordierite honeycomb substrate after sintering (i.e., heat treatment).

TABLE 1

| Batch Compositions of the Four Green Bodies. | | | | | | |
| --- | --- | --- | --- | --- | --- | --- |
| Component | | Weight Percent (wt. %) of Material in Green Body (#) | | | | |
| Category | Material | 1 | 2 | 3 | 4 | |
| Inorganic components | Barretts 93-37 Talc | 40.70 | 40.50 | 40.50 | | |
| | TT5 - Talc - FCOR | | | | 41.54 | |
| | FHC-03 Hydrous Kaolin | | 13.86 | 13.86 | | |
| | CSG Hydrous Kaolin | 14.33 | | | 13.85 | |
| | AA3 Alumina - A1000 SGD | | 26.00 | 26.00 | | |
| | AA5 Alumina - A3000 FL | 27.97 | | | | |
| | AA6 Alumina, Calcined - HVA-FG | | | | 28.03 | |
| | Dry Dispal 18N4-80 | | 2.50 | 2.50 | | |
| | SiO₂ A8 | 17.00 | | | | |
| | Imsil SiO₂ A10 | | 17.14 | 17.14 | | |
| | QQ5 Silica - Cerasil 300 | | | | 16.59 | |
| Pore Former components | Rice Starch | 10.00 | | | | |
| | Corn Starch | | 20.00 | | | |
| | Cross-linked Wheat Starch | | | 20.00 | | |
| | Cross-linked Potato Starch | | | | 22.00 | |
| | GG10 - 4566 Graphite | | | | 22.00 | |
| Binders/ Organic components | MM3 Methylcellulose | 4.00 | | | | |
| | F240 Methocel | | 4.00 | 4.00 | | |
| | SS3 Sodium Stearate Liga | | | | 1.50 | |
| | Methylcellulose TY06A | | | | 3.00 | |
| | Methylcellulose A4M | | | | 3.00 | |
| | Tall Oil Fatty Acid, L-5 | 0.60 | | | | |
| | Durasyn 162, Polyalphaolefin | 6.00 | 4.00 | 4.00 | | |
| | Total | 120.60 | 128.00 | 128.00 | 151.51 | |

The dry inorganic components in Table 1 were separately mixed for each of the four green bodies to form solid mixtures. The liquid addition, including the binders and organic components, where then added to the mixtures of the dry batch components, separately for each of the four green bodies, and mulled together for approximately 15-20 minutes to create four separate plasticized ceramic batch compositions.

The four plasticized ceramic batch compositions were separately extruded using conventional methods to form wet or green bodies. The green bodies were then dried in a humidity controlled oven to less than 10% moisture. A gas furnace was then used to fire the four green bodies at about 1410° C. for about 15 hours to form four ceramic honeycombs. After firing, the inorganic components of the batch compositions remain as part of the four resultant sintered ceramic honeycombs. The four sintered ceramic honeycombs, however, were essentially free of the binders/organic component shown in Table 1 as those components were degradated or removed during sintering. Sintered ceramic honeycomb 4, in a preparation step different from honeycombs 1-3, was core drilled out of a larger outer-diameter sintered honeycomb. The four sintered ceramic honeycombs had the properties provided in Table 2 below. The porosity characteristics of the four sintered ceramic honeycombs were determined by conventional mercury porosimetry methodologies. Again, sintered ceramic honeycombs 1 and 2 were prepared as example embodiments of the present disclosure. Conventional sintered ceramic honeycombs 3 and 4 were prepared as comparative examples. Sintered ceramic honeycomb 1 was prepared in a longer length than sintered ceramic honeycombs 2-4 for further testing as provided in other Examples below.

TABLE 2

Properties of the Four Ceramic Honeycombs.

| Property | Sintered Ceramic Honeycomb (#) | | | |
|---|---|---|---|---|
| | 1 | 2 | 3 | 4 |
| Outer Diameter (cm) | 2.54 | 2.54 | 2.54 | 2.54 |
| Number of cells/cm$^2$ | 130 | 130 | 130 | 130 |
| Channel diameter for each cell (mm) | 1.6 | 1.6 | 1.6 | 1.6 |
| Channel shape for each cell | round | round | round | square |
| Wall thickness (mm) | 0.559 | 0.559 | 0.559 | 0.559 |
| Porosity (%) | 47.1 | 45.4 | 45.9 | 63.6 |
| Pore Diameter Distribution (microns) | 1-10 | 1-10 | 1-10 | 9-100 |
| Median Pore Diameter (microns) | 3.82 | 4.61 | 5.54 | 22.73 |

Samples of sintered ceramic honeycombs 1-4 were each tested by conventional X-Ray Fluorescence (XRF) Analysis to determine their compositional components. The results and compositional components for sintered ceramic honeycombs 1-4 are provided in Table 3 below.

TABLE 3

Composition of Sintered Ceramic Honeycombs 1-4 as Determined by XRF Analysis.

| Compositional Component | Weight Percent (wt. %) of Component in Sintered Ceramic Honeycomb (#) | | | |
|---|---|---|---|---|
| | 1 | 2 | 3 | 4 |
| $Al_2O_3$ | 35.4 | 35.3 | 35.4 | 34.9 |
| $SiO_2$ | 50.0 | 50.0 | 49.9 | 49.8 |
| MgO | 13.68 | 13.69 | 13.67 | 13.44 |
| CaO | 0.080 | 0.093 | 0.095 | 0.070 |
| $Fe_2O_3$ | 0.51 | 0.55 | 0.53 | 0.97 |
| NiO | 0.012 | 0.004 | 0.007 | 0.226 |
| $TiO_2$ | 0.22 | 0.21 | 0.21 | 0.19 |
| $K_2O$ | 0.025 | 0.025 | 0.027 | 0.016 |
| $Na_2O$ | 0.10 | 0.09 | 0.17 | 0.37 |

Example 2: Durability of the Two Exemplary Sintered Ceramic Honeycombs to Alkaline Treatment, with Comparative Examples The four sintered ceramic honeycombs were each tested for durability following treatment (i.e., cleaning) of the substrates in an alkaline solution. Specifically, the strength change of sintered ceramic honeycombs 1 and 2, exemplary embodiments of the present disclosure, following alkaline solution treatment were compared to the strength change of conventional sintered ceramic honeycombs 3 and 4 following alkaline solution treatment. Sintered ceramic honeycomb bodies that are structurally resistant to alkaline treatment provide benefits (e.g., longer use life, greater filtration efficiency over its useful life, shorter cleaning cycles, broader filtration applications, etc.) when those sintered ceramic honeycomb bodies are used as filtration articles.

Eight, 2 mm long disks were cut (using a diamond saw) from sintered ceramic honeycombs 1-4. All of the disks were subsequently rinsed with deionized water and dried at 120° C. for 2 hours. Four of the 2 mm long disks for each of sintered ceramic honeycombs 1-4 were kept as a control group. These four, control disks were strength tested using the conventional ring-on-ring (RoR) strength test method. The results for these control tests are provided in Table 4 below.

The other four of the 2 mm long disks for each of sintered ceramic honeycombs 1-4 were treated in an alkaline solution. Specifically, these four disks were submerged and soaked in a 0.1 mole/liter sodium hydroxide solution with a pH 13 at 60° C. for 72 hours. Subsequently, the four alkaline solution treated disks from sintered ceramic honeycombs 1-4 were rinsed with deionized water, dried, and strength tested using the same RoR test method as the control group. The results for these tests of the alkaline solution treated disks are provided in Table 4 below.

TABLE 4

Ring-on-Ring Strength Test Results for Alkaline Treatment.

| | Sintered Ceramic Honeycomb (#) | | | |
|---|---|---|---|---|
| | 1 | 2 | 3 | 4 |
| 4 Control disks mean RoR strength (bar) [psi] | (24.48) [355.07] | (16.68) [241.84] | (19.78) [286.85] | (7.68) [111.45] |
| Std. Dev. of RoR strength for the 4 control disks (bar) [psi] | (7.76) [112.61] | (3.95) [57.32] | (3.40) [49.28] | (0.91) [13.19] |
| 4 alkaline solution treated disks mean RoR strength (bar) [psi] | (27.86) [404.10] | (17.98) [260.84] | (11.49) [166.65] | (3.85) [55.81] |
| Std. Dev. of RoR strength for the 4 alkaline solution treated disks (bar) [psi] | (7.08) [102.72] | (2.09) [30.26] | (2.05) [29.74] | (0.40) [5.78] |
| Percent change of the mean RoR strength | 13.81% | 7.85% | −41.90% | −49.93% |

Figure 2:
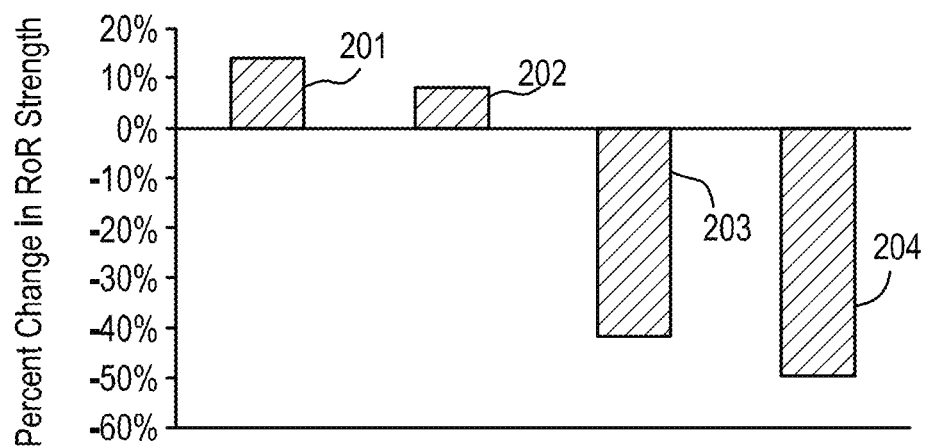
FIG. 2 provides a plot of the percent change in strength of membrane filtration articles following treatment according to an exemplary embodiment.

As shown in Table 4 above, sintered ceramic honeycombs 1 and 2 unexpectedly increased in strength after treatment with hot, high pH alkaline solution. Specifically, sintered ceramic honeycombs 1 and 2 increased in strength by about 13.81% and about 7.85%, respectively. Comparative examples, sintered ceramic honeycombs 3 and 4, illustrate that one of ordinary skill in the art would have expected to see a decrease in strength following treatment with high pH alkaline solution. Specifically, sintered ceramic honeycombs 3 and 4 decreased in strength by about 41.90% and about 49.93%, respectively, under the same treatment conditions. FIG. 2 provides a graphical comparison of the percent change in the mean RoR strength between sintered ceramic honeycombs 1-4. In FIG. 2, Sintered Ceramic Honeycombs 1-4 are shown as bar graphs 201-204, respectively, from left to right. Without being limited to any particular theory, the inventors propose that the increase in the strength in sintered ceramic honeycombs 1 and 2 is a result of their composition (e.g., $0.001 \leq Na_2O \leq 0.10$ wt. %; $0.01 \leq K_2O \leq 0.13$ wt. %; and $Na_2O + K_2O \leq 0.13$ wt. %) such that a glass phase is not formed during sintering. Instead, cordierite particles bond together for increased strength of the ceramic honeycomb. It is expected that sintered ceramic honeycombs 1-4 would have similar strength profiles if they had been tested by the convention modulus of rupture (MoR) strength test.

Example 3: Durability of the Two Exemplary Sintered Ceramic Honeycombs to Acidic Treatment, with Comparative Examples Sintered ceramic honeycombs 1 and 4 were each tested for durability following treatment (i.e., cleaning) of the substrates in an acidic solution. Specifically, the strength change of sintered ceramic honeycomb 1, an exemplary embodiment of the present disclosure, following acidic solution treatment was compared to the strength change of conventional sintered ceramic honeycomb 4 following acidic solution treatment. Sintered ceramic honeycomb bodies that are structurally resistant to acidic treatment provide benefits (e.g., longer use life, greater filtration efficiency over its useful life, shorter cleaning cycles, broader filtration applications, etc.) when those sintered ceramic honeycomb bodies are used as filtration articles.

Using the same procedure as set forth in Example 2 above, four control disks for each of sintered ceramic honeycombs 1 and 4 were strength tested using the RoR strength test method. Also, the other four of the 2 mm long disks were submerged and soaked in 0.1 mole/liter hydrochloride solution with a pH 1 at 60° C. for 72 hours. Subsequently, the four acidic solution treated disks from sintered ceramic honeycombs 1 and 4 were rinsed with deionized water, dried, and strength tested using the same RoR test method as the control group. The results for these tests of the acidic solution treated disks are provided in Table 5 below.

TABLE 5

Ring-on-Ring Strength Test Results for Acidic Treatment.

|  | Sintered Ceramic Honeycomb (#) | |
| --- | --- | --- |
|  | 1 | 4 |
| 4 Control disks mean RoR strength (bar) [psi] | (24.48) [355.07] | (7.68) [111.45] |
| Std. Dev. of RoR strength for the 4 control disks (bar) [psi] | (7.76) [112.61] | (0.91) [13.19] |
| 4 alkaline solution treated disks mean RoR strength (bar) [psi] | (16.59) [240.61] | (3.13) [45.36] |
| Std. Dev. of RoR strength for the 4 alkaline solution treated disks (bar) [psi] | (4.92) [71.39] | (0.12) [1.726] |
| Percent change of the mean RoR strength | −32.24% | −59.30% |

Figure 3:
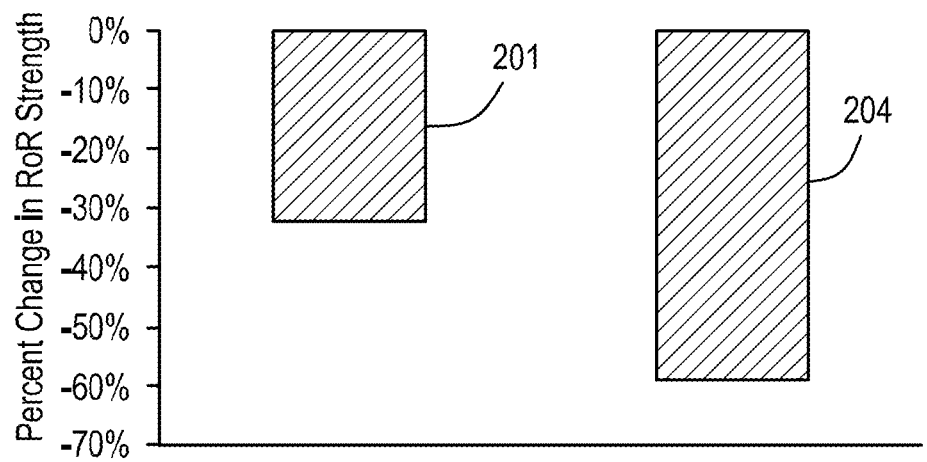
FIG. 3 provides a plot of the percent change in strength of membrane filtration articles following treatment according to an exemplary embodiment.

As shown in Table 5 above, sintered ceramic honeycomb 1 unexpectedly had a lesser percent change in its mean RoR strength, after treatment with hot, low pH acidic solution. Specifically, sintered ceramic honeycomb 1 decreased in strength by about 32.24%. Comparative example sintered ceramic honeycomb 4 illustrates that one of ordinary skill in the art would have expected to see a much larger decrease in strength following treatment with low pH acidic solution. Specifically, sintered ceramic honeycomb 4 decreased in strength by about 59.30% under the same treatment conditions. FIG. 3 provides a graphical comparison of the percent change in the mean RoR strength between sintered ceramic honeycombs 1 and 4. In FIG. 3, Sintered Ceramic Honeycombs 1 and 4 are shown as bar graphs 201 and 204, respectively, from left to right. Without being limited to any particular theory, the inventors propose that the difference in the percent decrease in the mean RoR strength in sintered ceramic honeycombs 1 and 4 is a result of their low-sodium or low-potassium composition (or both low-sodium and low-potassium composition) such that a glass phase is not formed during sintering. Instead, cordierite particles bond together for increased strength of the ceramic honeycomb. That is, acidic treatment was unable to extract the metallic elements from sintered ceramic honeycomb 1. It is expected that sintered ceramic honeycombs 1 and 4 would have had similar strength profiles if they had been tested by the convention modulus of rupture (MoR) strength test.

Example 4: Formation of Exemplary Porous Membranes on Exemplary Sintered Ceramic Honeycomb 1

The extra length of sintered ceramic honeycomb 1 mentioned above, having the same properties and composition as described above in Tables 2 and 3, was cut to form ten lengths of 30.48 cm (12 inches). The ten lengths are hereinafter referred to as sintered ceramic honeycombs 1.1-1.10. Sintered ceramic honeycombs 1.1, 1.2, and 1.7 were prepared for coating with a porous cordierite membrane on the porous partition walls thereof. All the other sintered ceramic honeycombs (i.e., 1.3, 1.4, 1.5, 1.6, 1.8, 1.9, and 1.10) were prepared for coating with a porous cordierite-alumina composite membrane on the porous partition walls thereof.

To prepare the components for the porous membrane, a pure cordierite powder was prepared and milled to a median particle size of 1.4 microns. The cordierite powder was tested by XRF Analysis to determine its compositional components. The results and compositional components for the cordierite powder are provided in Table 6 below.

TABLE 6

Composition of the Cordierite Powder Used in the Porous Membranes as Determined by XRF Analysis.

| Compositional Component | Weight Percent (wt. %) of Component in Cordierite Powder Used in the Porous Membrane |
| --- | --- |
| $Al_2O_3$ | 35.5 |
| $SiO_2$ | 49.6 |
| MgO | 13.52 |
| CaO | 0.089 |
| $Fe_2O_3$ | 0.61 |
| NiO | 0.009 |
| $TiO_2$ | 0.60 |
| $K_2O$ | 0.028 |
| $Na_2O$ | 0.07 |

To prepare the cordierite membranes, a 500 gram cordierite slurry was prepared. First, 0.22 grams of Tiron (i.e., 4,5-Dihydronly-1,3-benzenedissulfonic acid disodium salt)

was added to a 388.25 grams of deionized water and fully dissolved therein to form a mixture. Subsequently, 40.03 grams of Rhoplex Multilobe 400 emulsion polymer (with 53.0 wt. %-54.0 wt. % solids) and 71.8 grams of the milled cordierite powder (with its composition set forth in Table 6) was added to the mixture to form the cordierite slurry. Prior to application, the cordierite slurry was then mixed for 20 hours via magnetic stir bar, filtered through a 37 micron screen, and degassed with a vacuum pump.

Separately, to prepare the cordierite-alumina composite membranes, a 500 gram cordierite-alumina composite slurry was prepared. First, 0.09 grams of Tiron was added to 143.60 grams of deionized water and fully dissolved therein to form a mixture. Subsequently, 45.90 grams of a 20 wt. % polyethylene glycol (PEG) solution and 30.41 grams of the milled cordierite powder (with its composition set forth in Table 6) was added to the mixture to form the cordierite slurry. The cordierite slurry was mixed for 20 hours via magnetic stir bar. Second, 0.04 grams of Tiron was added to 61.36 grams of deionized water and fully dissolved therein to form a mixture. Subsequently, 15.38 grams of a 20 wt. % polyethylene glycol (PEG) solution and 13.03 grams of alumina A-16 was added to the mixture to form the alumina slurry. The alumina had a median particle size from about 0.2 micron to about 0.3 micron. The alumina slurry was mixed for 20 hours via magnetic stir bar. Finally, 210 grams of the mixed cordierite slurry and 90 g of the mixed alumina slurry were combined to create a cordierite-alumina composite slurry. The cordierite-alumina composite slurry was then further mixed for 20 hours via magnetic stir bar, filtered through a 37 micron screen, and degassed with a vacuum pump. The resultant cordierite-alumina composite slurry included 15 wt. % solids (cordierite and alumina).

The cordierite slurry and the cordierite-alumina composite slurry were each applied to their respective sintered ceramic honeycombs, provided in Table 7 below, using the following method. In a separate process for each of the ten sintered ceramic honeycombs, one of the ten lengths of sintered ceramic honeycomb 1 was mounted in a flow coater. The flow coater creates a ring seal around the outer diameter on each end of the sintered ceramic honeycomb. The upper end seal of the flow coater is connected to a reservoir for the slurry, and the lower end seal of the flow coater is connected to a vacuum. Subsequently, a vacuum force is pulled across the sintered ceramic honeycomb for 20 seconds such that the slurry coats the channel walls of the sintered ceramic honeycomb. When the vacuum is removed, residual slurry is released back to the reservoir. Each coated sintered ceramic honeycomb was then removed from the flow coater, spun in a centrifuge at 525 revolutions per minute for 1 minute, and dried for 2 hours at 120° C. Subsequently, each coated sintered ceramic honeycomb was again coated in the flow coater using the same procedure above, spun in a centrifuge at 525 revolutions per minute for 1 minute, and dried for 2 hours at 120° C. Finally, the twice coated sintered ceramic honeycomb was sintered (i.e., fired) for 2 hours at either 1150° C. or 1250° C., with a heating rate of 1° C. per minute and a cooling rate of 2° C. per minute, whereby forming the membrane of the channel walls of the sintered ceramic honeycomb. The sintering temperature and the sintered properties of each porous membrane on each sintered ceramic honeycomb 1 is provided in Table 7 below.

TABLE 7

Properties and Sintering Temperature of Exemplary Porous Membranes on Exemplary Sintered Ceramic Honeycomb 1.

| Sintered Ceramic Honeycomb 1 (#) | Membrane Material | Membrane Firing Temperature (° C.) | Membrane Median Pore Diamter (micron) | Membrane Total Porosity (%) | Membrane Thickness (microns) |
|---|---|---|---|---|---|
| 1.1 | Cordierite | 1150 | 0.4 | 56 | 10 |
| 1.2 | Cordierite | 1150 | 0.4 | 56 | 10 |
| 1.3 | Cordierite-alumina composite | 1150 | 0.25 | 47 | 20 |
| 1.4 | Cordierite-alumina composite | 1150 | 0.25 | 47 | 20 |
| 1.5 | Cordierite-alumina composite | 1150 | 0.25 | 47 | 20 |
| 1.6 | Cordierite-alumina composite | 1250 | 0.25 | 47 | 20 |
| 1.7 | Cordierite | 1150 | 0.4 | 56 | 10 |
| 1.8 | Cordierite-alumina composite | 1150 | 0.35 | 36 | 20 |
| 1.9 | Cordierite-alumina composite | 1200 | 0.25 | 47 | 23 |
| 1.10 | Cordierite-alumina composite | 1200 | 0.25 | 47 | 23 |

Figure 4:
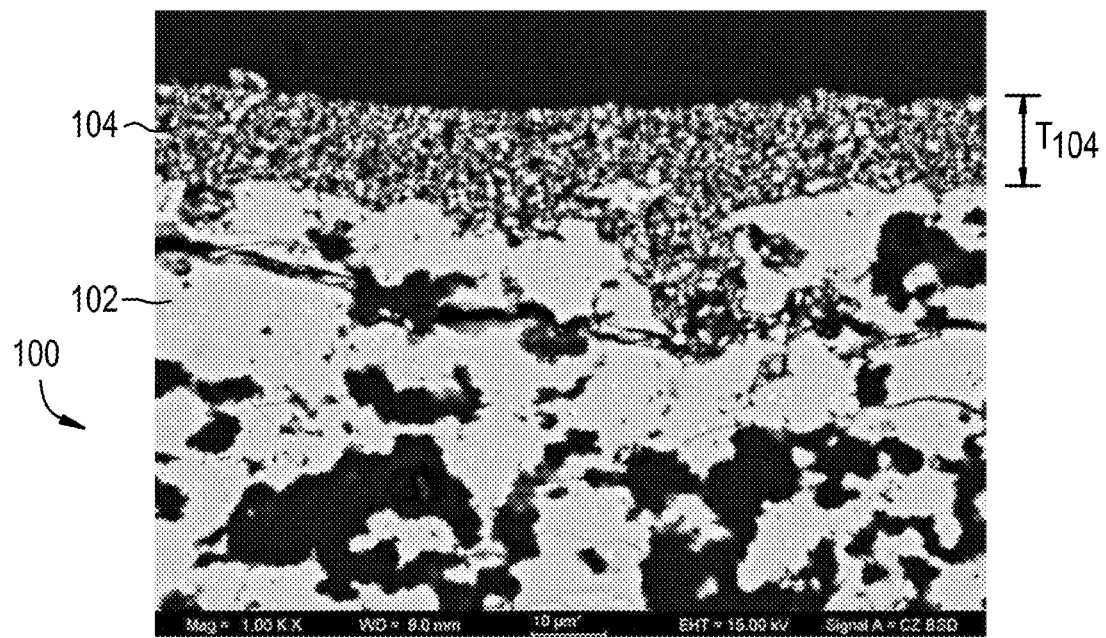
FIG. 4 provides a scanning electron microscope (SEM) image of a cross-section of a membrane filtration article wall according to an exemplary embodiment.
Figure 5:
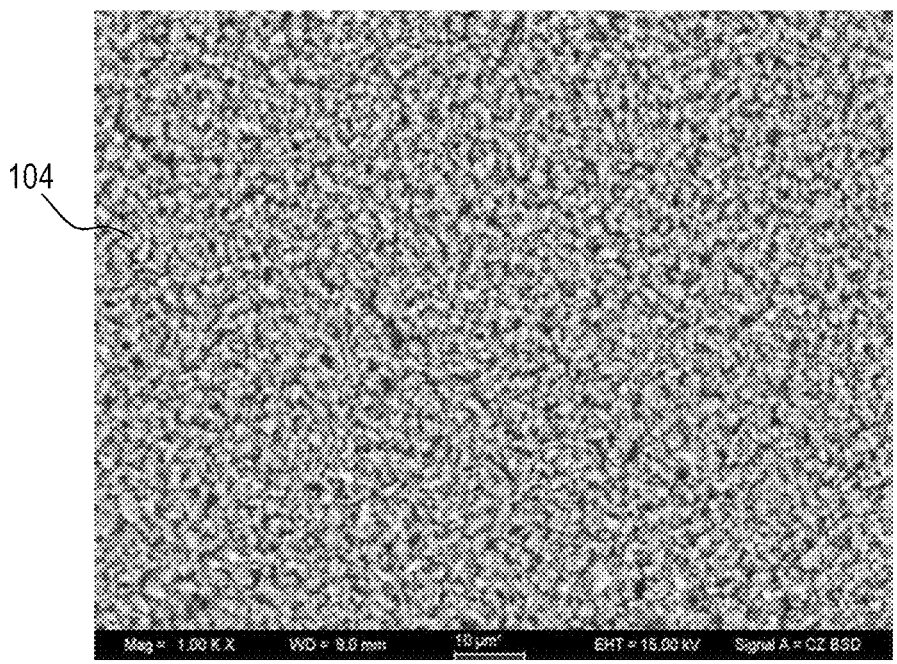
FIG. 5 provides a SEM image of the membrane on the filtration article wall in FIG. 4.
Figure 6:
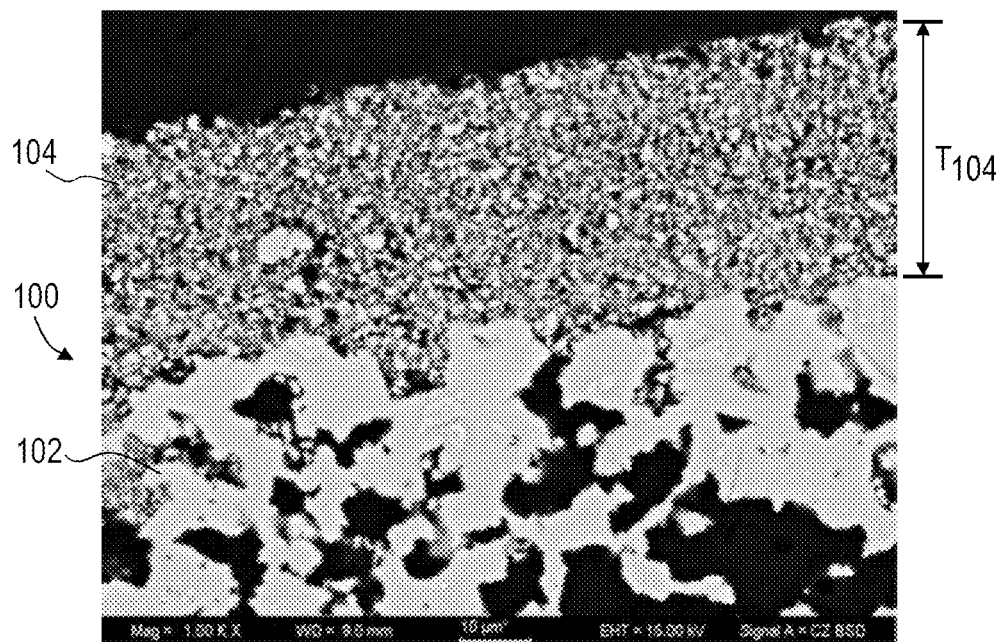
FIG. 6 provides a SEM image of a cross-section of a filtration article wall according to an exemplary embodiment.
Figure 7:
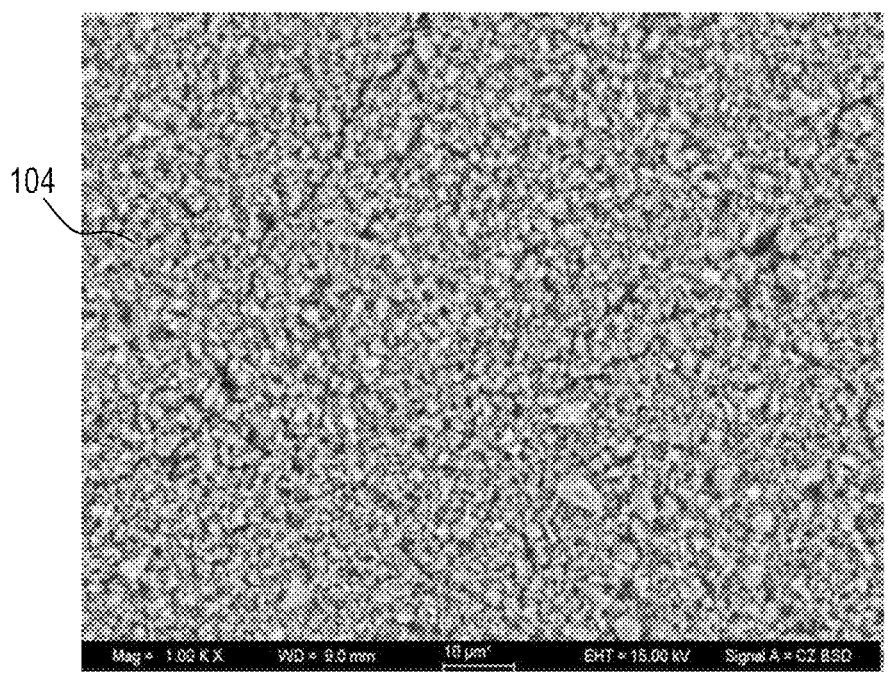
FIG. 7 provides a SEM image of the membrane on the filtration article wall in FIG. 6.

FIG. 4 provides a SEM image of a cross-section of a channel wall of sintered ceramic honeycomb 1.1 with the porous cordierite membrane thereon. FIG. 5 provides a scanning electron microscope (SEM) image of the porous cordierite membrane on the channel walls of sintered ceramic honeycomb 1.1. FIG. 6 provides a SEM image of a cross-section of a channel wall of sintered ceramic honeycomb 1.3 with the porous cordierite-alumina composite membrane thereon. FIG. 7 provides a SEM image of the porous cordierite-alumina composite membrane on the channel walls of sintered ceramic honeycomb 1.3.

In the next examples, the sintered ceramic honeycombs with membranes formed on the channel walls thereof were tested for permeability, chemical durability, and abrasion resistance in the following examples.

Example 5: Permeability of Water and Water from Skim Milk Through Exemplary Sintered Ceramic Honeycomb 1 with Exemplary Porous Membranes Thereon Before Alkaline and/or Acidic Treatment The permeability of deionized water was determined into an end and out the outer circumference of sintered ceramic honeycombs 1.1-1.4 with their respective porous membranes (see Table 7) on the channel walls thereof. Each of these four filtration articles was separately tested in a conventional filtration testing apparatus. Specifically, each end of sintered ceramic honeycombs 1.1-1.4 (with their respective porous membranes on their channel walls) was sealed to flow water through their open channels in an axial direction. The water flowed to each of the filtration articles with a velocity of about 170 centimeters per second at a pressure of about 1.72 bars (25 psi). Water flow rate into filtration article was 30.3 liters per minute (8 gallons per minute). Water permeated through the porous membrane(s) and channel wall(s) of sintered ceramic honeycomb to the outer circumference of each filtration article. Permeance of water through each of the filtration articles was calculated (and is provided in Table 8 below) using the following equation:

$$P = \frac{V_P}{SA_M \cdot TMP}$$

where,
P=permeance (Liters/m²/hour/bar)
$V_P$=flow rate across and out of the open channels of each filtration article (Liters/hour)
$SA_M$=membrane surface area in all the channels of each filtration article (m²)
TMP=trans membrane pressure (bar)

Using the same procedure as described above, the filtration efficiency of water from fat free skim milk (Byrne Dairy) was determined for sintered ceramic honeycombs 1.1-1.10 with their respective porous membranes (see properties in Table 7) on the channel walls thereof. The filtration efficiency was calculated by measuring turbidity of the inlet skim milk and of water from skim milk permeating through the outer circumference of each of the filtration articles at 1 minute, 5 minutes, and 10 minutes after the start of filtration. The filtration efficiency (FE) was calculated (and is provided in Table 8 below) using the following equation:

$$FE = \frac{T_F - T_P}{T_F}$$

where,
$T_F$=turbidity of the milk feed stream (NTU)
$T_P$=turbidity of the permeate water stream (NTU)

TABLE 8

Water Permeance and Skim Milk Filtration Efficiencies for Exemplary Filtration Articles.

| Sintered Ceramic Honeycomb 1 (#) | Membrane Material | Water Permeance (Liters/hour/m²/bar) | Filtration Efficiency (%) at | | |
|---|---|---|---|---|---|
| | | | 1 minute | 5 minutes | 10 minutes |
| 1.1 | Cordierite | 1077 | 34.7 | 58.3 | 74.7 |
| 1.2 | Cordierite | 927 | 31.1 | 51.8 | 61.8 |
| 1.3 | Cordierite-alumina composite | 580 | 98.3 | 97.7 | 97.1 |
| 1.4 | Cordierite-alumina composite | 316 | 91.0 | 91.9 | 92.5 |
| 1.5 | Cordierite-alumina composite | N/A | 94.7 | 91.1 | 89.7 |
| 1.6 | Cordierite-alumina composite | N/A | 83.5 | 90.4 | 91.7 |
| 1.7 | Cordierite | N/A | 64.4 | 59.9 | 67.1 |
| 1.8 | Cordierite-alumina composite | N/A | 92.7 | 93.7 | 97.1 |
| 1.9 | Cordierite-alumina composite | N/A | 87.7 | 89.9 | 91.7 |
| 1.10 | Cordierite-alumina composite | N/A | 85.9 | 89.3 | 91.6 |

The water permeance and filtration efficiency of skim milk in the above listed filtration articles was used for comparison purposes after alkaline treatment, acidic treatment, as abrasion testing processes provided in the next Examples.

Example 6: Durability of Exemplary Filtration Articles Following Alkaline Treatment and/or Acidic Treatment Exemplary filtration articles (from those listed in Tables 7 and 8) were treated to alkaline and/or acidic solutions. Recurring acidic and/or alkaline cleaning of conventional cordierite filtration membranes is known by those skilled in the art to decrease filtration efficiency of filtration articles. In addition, recurring acidic and/or alkaline cleaning of conventional cordierite filtration membranes can lessen the useful life of filtration articles. To demonstrate the unexpected durability of filtration articles of the present disclosure following repeated alkaline and acidic cleaning, example filtration articles where treated using three separate treatment procedures, described below.

In a first alkaline treatment procedure, filtration articles were separately submerged and soaked in a 0.1 mole/liter sodium hydroxide solution with a pH 13 at 60° C. After 72 hours, 168 hours, and 264 hours of soaking, the filtration articles where removed from the alkaline solution, triple rinsed and soaked in deionized water, and then underwent skim milk filtration efficiency tests as described in Example 5 above. The filtration efficiency was calculated by measuring turbidity of the inlet skim milk and of water from skim milk permeating through each of the filtration articles at 1 minute, 5 minutes, and 10 minutes after the start of filtration. The filtration efficiency results before alkaline treatment, and after 72 hours, 162 hours, and 264 hours of alkaline treatment are provided for two exemplary filtration articles in Table 9 below.

TABLE 9

Filtration Efficiency of Exemplary Filtration Articles after Alkaline Treatments.

| Sintered Ceramic Honeycomb 1 (#) | Membrane Material | Treatment in Alkaline Solution (hours) | Filtration Efficiency (%) at | | |
|---|---|---|---|---|---|
| | | | 1 minute | 5 minutes | 10 minutes |
| 1.1 | Cordierite | 0 | 34.7 | 58.3 | 74.7 |
| | | 72 | 86.4 | 87.7 | 90.2 |
| | | 168 | 87.0 | 89.4 | 93.9 |
| | | 264 | 87.2 | 83.8 | 86.7 |
| 1.3 | Cordierite-alumina composite | 0 | 98.3 | 97.7 | 97.1 |
| | | 72 | 97.1 | 98.9 | 99.0 |
| | | 168 | 99.2 | 98.9 | 99.2 |
| | | 264 | 98.3 | 98.6 | 98.7 |

The results in Table 9 were unexpected because the porous membrane compositions of the present disclosure exhibited equivalent or better filtration efficiency after simulating the equivalent of 5 years of alkaline cleanings. Conventional cordierite filtration articles are known to decrease in filtration efficiency after repeated alkaline cleanings due to negative impact on membrane microstructure and membrane strength.

In a second acidic treatment procedure, filtration articles (from those listed in Tables 7 and 8) were separately submerged and soaked in a 0.46 grams/liter citric acid solution with a pH 3 at 30° C. for 264 hours. After 72 hours, 168 hours, and 264 hours of soaking, the filtration articles where removed from the acidic solution, triple rinsed and soaked in deionized water, and then underwent skim milk filtration efficiency tests as described in Example 5 above. The filtration efficiency was calculated by measuring turbidity of the inlet skim milk and of water from skim milk permeating through each of the filtration articles at 1 minute, 5 minutes, and 10 minutes after the start of filtration. The filtration efficiency results before acidic treatment, and after 72 hours, 162 hours, and 264 hours of alkaline treatment are provided in Table 10 below.

In a third procedure, exemplary filtration articles (from those listed in Tables 7 and 8) where subjected to alkaline treatment followed by acidic treatment. In the procedure, an exemplary filtration article was sequentially submerged and soaked in a 0.1 mole/liter sodium hydroxide solution with a pH 13 at 60° C. for 72 hours, rinsed with deionized water, and then submerged and soaked in a 0.46 gram/liter citric acid solution with a pH 3 at 30° C. for 24 hours. After this sequential alkaline then acidic treatment, the filtration articles where triple rinsed and soaked in deionized water, and then underwent skim milk filtration efficiency tests as described in Example 5 above. The filtration efficiency was calculated by measuring turbidity of the inlet skim milk and of water from skim milk permeating through each of the

TABLE 10

Filtration Efficiency of Exemplary Filtration Articles after Acidic Treatments.

| Sintered Ceramic Honeycomb 1 (#) | Membrane Material | Firing Temp (° C.) | Treatment in Acidic Solution (hours) | Filtration Efficiency (%) at | | |
|---|---|---|---|---|---|---|
| | | | | 1 min. | 5 min. | 10 min. |
| 1.2 | Cordierite | 1150 | 0 | 31.1 | 51.8 | 61.8 |
| | | | 72 | 42.6 | 45.8 | 41.1 |
| | | | 168 | 48.1 | 35.1 | 49.3 |
| | | | 264 | 36.0 | 34.7 | 34.6 |
| 1.4 | Cordierite-alumina composite | 1150 | 0 | 91.0 | 91.9 | 92.5 |
| | | | 72 | 94.5 | 93.9 | 94.2 |
| | | | 168 | 98.1 | 97.7 | 97.4 |
| | | | 264 | 96.8 | 96.8 | 96.6 |

The results in Table 10 were unexpected for sintered ceramic honeycomb 1.4 (with a cordierite-alumina composite membrane thereon) because it exhibited equivalent or better filtration efficiency after simulating the equivalent of 5 years of acidic cleanings. The results in Table 10 illustrate the porous cordierite membrane on exemplary sintered ceramic honeycomb 1.2 was resilient to acidic cleaning after 1 minute of filtration but decreased in filtration efficiency from 61.8% to 34.6% (about a 44% decrease) after 10 minutes of filtration. It is expected that exemplary filtration articles will have more than 10 years of useful life as acidic cleaning is needed less frequently (as little as ⅓ of the time as alkaline cleanings) as illustrated in treatment time in Table 11.

filtration articles at 1 minute, 5 minutes, and 10 minutes after the start of filtration. Subsequently, sintered ceramic honeycombs 1.6 & 1.9 (with cordierite-alumina composite membranes thereon) were again sequentially submerged and soaked in a 0.1 mole/liter sodium hydroxide solution with a pH 13 at 60° C. for 72 hours, rinsed with deionized water, and then submerged and soaked in a 0.46 gram/liter citric acid solution with a pH 3 at 30° C. for 52 hours. The skim milk filtration efficiency was again calculated for this filtration article at 1 minute, 5 minutes, and 10 minutes after the start of filtration. The filtration efficiency results are provided in Table 11 below.

TABLE 11

Filtration Efficiency of Exemplary Filtration Articles after Alkaline and Acidic Treatments.

| Sintered Ceramic Honeycomb 1 (#) | Membrane Material | Firing Temp. (° C.) | Treatment in Alkaline Solution (hours) | Treatment in Acidic Solution (hours) | Filtration Efficiency (%) at | | |
|---|---|---|---|---|---|---|---|
| | | | | | 1 min. | 5 min. | 10 min. |
| 1.5 | Cordierite-alumina composite | 1150 | 0 | 0 | 94.7 | 91.1 | 89.7 |
| | | | 72 | 24 | 25.8 | 24.5 | 24.2 |
| 1.6 | Cordierite-alumina composite | 1250 | 0 | 0 | 83.5 | 90.4 | 91.7 |
| | | | 72 | 24 | 92.1 | 93.1 | 94.4 |
| | | | 144 | 76 | 91.2 | 92.8 | 94.1 |
| 1.9 | Cordierite-alumina composite | 1200 | 0 | 0 | 87.7 | 89.9 | 91.7 |
| | | | 72 | 24 | 92.7 | 93.8 | 94.0 |
| | | | 144 | 76 | 92.2 | 92.5 | 93.2 |

The results in Table 11 were unexpected for sintered ceramic honeycomb 1.6 (with a cordierite-alumina composite membrane thereon) because it exhibited better filtration efficiency after simulating the equivalent of 3 years of sequential alkaline and acidic cleanings. The results in Table 11 illustrate the porous cordierite-alumina composite membrane on exemplary sintered ceramic honeycomb 1.5 didn't perform filtration as well after to sequential alkaline and acidic cleanings and decreased in filtration efficiency from 89.7% to 24.2% (about a 73% decrease). Table 11 suggests that a higher firing temperature of 1200° C., or even 1250° C., results in a membrane more resistant to sequential alkaline and acidic cleanings as compared to a membrane fired at a lower temperature (e.g., 1150° C.). It is known to one of ordinary skill in the art that sequential acidic and basic treatments is more aggressive (and potentially destructive) to filtration articles. Thus, samples 1.3 and 1.4 performed better than 1.5, albeit the same firing temperature of 1150° C.

Example 7: Durability of Exemplary Filtration Articles to Abrasion During Filtration Exemplary filtration articles (from those listed in Tables 7 and 8) were subjected to abrasion testing to determine resistance and durability of the filtration membrane compositions to abrasion seen in typical filtration applications. Each of the filtration articles (provided in Table 12 below) was separately tested in a conventional filtration testing apparatus, as described in Example 5 above.

An alumina slurry was used in this Example to simulate particulate (e.g., sand, silica, etc.) abrasion on the filtration article seen in typical filtration applications. To create the alumina slurry, 10 grams of alumina powder (with a mean particle size of 300 nm) was added to each liter of water flowing through the filtration apparatus. Each end of sintered ceramic honeycombs 1.6-1.10 (with their respective porous membranes on their channel walls) was sealed to flow (via a pneumatic diaphragm pump) the alumina slurry through their open channels in an axial direction for 8 hours. The alumina slurry flow rate was 15.12 liters per minute through each of the filtration articles with a linear velocity of about 400 centimeters per second at a pressure of between about 0.01 bars and about 0.1 bars. After 8 hours of abrasion testing, the filtration articles underwent skim milk filtration efficiency tests as described in Example 5 above. The filtration efficiency was calculated by measuring turbidity of the inlet skim milk and of water from skim milk permeating through the outside diameter of each of the filtration articles at 1 minute, 5 minutes, and 10 minutes after the start of filtration. The filtration efficiency results are provided in Table 12 below.

TABLE 12

Filtration Efficiency of Exemplary Filtration Articles after Abrasion Testing.

| Sintered Ceramic Honeycomb 1 (#) | Membrane Material | Firing Temp. (° C.) | Abrasion testing (hours) | Filtration Efficiency (%) at | | |
|---|---|---|---|---|---|---|
| | | | | 1 min. | 5 min. | 10 min. |
| 1.6 | Cordierite-alumina composite | 1250 | 0 | 70.6 | 84.0 | 86.6 |
| | | | 8 | 83.5 | 90.4 | 91.7 |
| 1.7 | Cordierite | 1150 | 0 | 64.4 | 59.9 | 67.1 |
| | | | 8 | 54.2 | 63.6 | 68.3 |
| 1.8 | Cordierite-alumina composite | 1150 | 0 | 92.7 | 93.7 | 97.1 |
| | | | 8 | 55.4 | 53.4 | 54.3 |
| 1.9 | Cordierite-alumina composite | 1200 | 0 | 92.2 | 92.5 | 93.2 |
| | | | 8 | 98.5 | 97.1 | 97.4 |
| 1.10 | Cordierite-alumina composite | 1200 | 0 | 85.9 | 89.3 | 91.6 |
| | | | 8 | 97.9 | 98.4 | 98.7 |

The results in Table 12 were unexpected for sintered ceramic honeycomb 1.6 (with a cordierite-alumina composite membrane thereon) because it exhibited better filtration efficiency after simulating 8 hours of simulated abrasion during filtration. Table 12 results were also unexpected because a higher firing temperature of 1250° C. (for sintered ceramic honeycomb 1.6 with a cordierite-alumina composite thereon) results in a membrane that is more resistant to abrasive filtration processes than a similar filtration article (i.e., sintered ceramic honeycomb 1.8 with a cordierite-alumina composite thereon) fired at a lower temperature (e.g., 1150° C.). The results in Table 12 also provide that cordierite membrane compositions of the present disclosure are resistant to abrasive filtration operations and retain similar filtration efficiencies thereafter.

Example 8: Filtration Efficiency of Exemplary Filtration Articles for a Crude Oil/Water Emulsion with Intermittent Alkaline Cleaning The extra length of sintered ceramic honeycomb 1 mentioned above, having the same properties and composition as described above in Tables 2 and 3, was cut to form two additional lengths of 30.48 cm (12 inches). The two lengths are hereinafter referred to as sintered ceramic honeycombs 1.11 & 1.12. Sintered ceramic honeycomb 1.11 was prepared for coating with a porous cordierite membrane on the porous partition walls thereof. Sintered ceramic honeycomb 1.12 was prepared for coating with a porous cordierite-alumina composite membrane on the porous partition walls thereof. The sintering temperature and the sintered properties of each porous membrane on each sintered ceramic honeycomb 1 is provided in Table 13 below.

TABLE 13

Properties and Sintering Temperature of Exemplary Porous Membranes on Exemplary Sintered Ceramic Honeycomb 1.

| Sintered Ceramic Honeycomb 1 (#) | Membrane Material | Membrane Firing Temperature (° C.) | Membrane Median Pore Diamter (micron) | Membrane Total Porosity (%) | Membrane Thickness (microns) |
|---|---|---|---|---|---|
| 1.11 | Cordierite | 1250 | 0.4 | 56 | 10 |
| 1.12 | Cordierite-alumina composite | 1250 | 0.25 | 47 | 20 |

Each of sintered ceramic honeycombs 1.11 and 1.12 were tested for filtration efficiency of water from a crude oil/water emulsion with less than 1000 ppm of oil in water and some inorganics to mimic an oil/water emulsion from an oil well. The emulsion was pumped separately, axially across each of sintered ceramic honeycombs 1.11 and 1.12 at about 22.71 L/min and about 7.5 psi. Pressure across the membrane (i.e., trans-membrane pressure) was measured at about 0.5 bar. Radial water permeance (L/hr/m²/bar) through the sintered ceramic honeycomb 1.11 (and a cordierite membrane thereon) was measured over about 480 hours for the first filtration run of sintered ceramic honeycomb 1.11. The permeance curve 301 for the first run of sintered ceramic honeycombs 1.11 is provided in FIG. 8. Subsequently, fouled sintered ceramic honeycomb 1.11 was cleaned by contacting with a cleaning mixture of 99.8 wt. % sodium hydroxide (with a pH of 13) and about 0.2 wt. % Alconox® at about 60-80° C. Specifically, the mixture was flowed only axially through the channels for about 60 minutes. Then a second cleaning mixture (of 99.8 wt. % sodium hydroxide (with a pH of 13) and about 0.2 wt. % Alconox® at about 60-80° C.) was reverse flowed radially through the membrane to the honeycomb channels for about 60 minutes.

Figure 8:
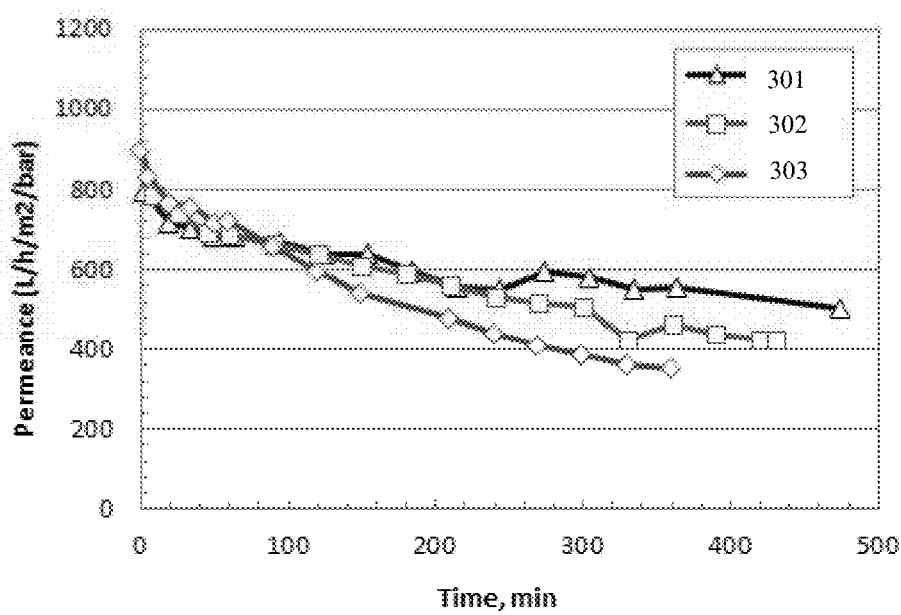
FIG. 8 provides the filtration efficiency for three subsequent tests of a filtration article for a crude oil and water emulsion after subsequent alkaline cleaning operations described in Example 8.

This filtration and duplicate cleaning was repeated twice more. The water permeance curves 302, 303 for the two subsequent runs of sintered ceramic honeycomb 1.11 (and cordierite membrane thereon) are also provided in FIG. 8. Turbidity of the water permeate from all three runs was less than 0.3 Nephelometric Turbidity Units (NTUs), which is less than about 1 mL of oil per gram of water permeate. FIG. 8 provides that the composition of sintered ceramic honeycomb 1.11 (and a cordierite membrane thereon) is resistant to degradation from alkaline cleaning and recovered >80% of its original flux after cleaning.

Figure 9:
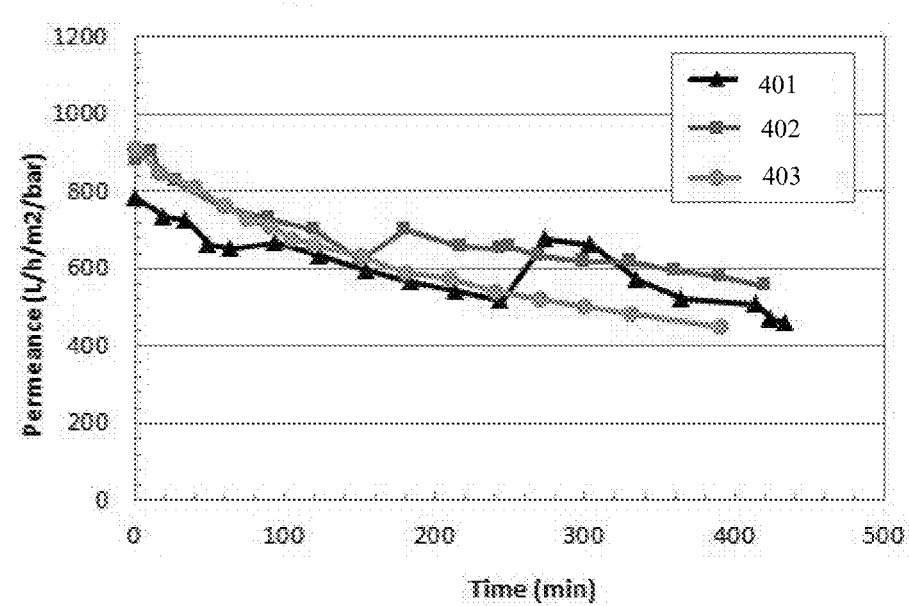
FIG. 9 provides the filtration efficiency for three subsequent tests of a filtration article for a crude oil and water emulsion after subsequent alkaline cleaning operations described in Example 8.

Radial water permeance (L/hr/m²/bar) through the sintered ceramic honeycomb 1.12 (and a cordierite-alumina composite membrane thereon) was measured the same to that for sintered ceramic honeycomb 1.12. The permeance curve 401 for the first run of sintered ceramic honeycombs 1.12 is provided in FIG. 9. After about 420 hours, fouled sintered ceramic honeycomb 1.12 was cleaned as described above. This filtration and cleaning process was repeated twice more. The water permeance curves 402, 403 for the two subsequent runs of sintered ceramic honeycomb 1.12 (and a cordierite-alumina composite membrane thereon) are also provided in FIG. 9. Turbidity of the water permeate from all three runs was less than 0.3 Nephelometric Turbidity Units (NTUs), which is less than about 1 mL of oil per gram of water permeate. FIG. 9 provides that the composition of sintered ceramic honeycomb 1.1 (and a cordierite-alumina composite membrane thereon) is resistant to degradation from alkaline cleaning and recovered >80% of its original flux after cleaning.

As used herein, the singular forms "a," "an," and "the" include plural referents unless the context clearly dictates otherwise. Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It will be apparent to those skilled in the art that various modifications and variations can be made to the present disclosure without departing from the spirit and scope of hereof. Since modifications combinations, sub-combinations and variations of the disclosed embodiments incorporating the spirit and substance of the present disclosure may occur to persons skilled in the art, the disclosure should be construed to include everything within the scope of the appended claims and their equivalents.

What is claimed is:

1. A method of making a ceramic article, the method comprising:
    forming a green membrane layer by applying a first composition onto at least a portion of partition walls of a honeycomb body, wherein the partition walls of the honeycomb body are formed from a second composition, the first composition comprises: $Al_2O_3$, $SiO_2$, MgO, and a sodium content in the form of $Na_2O$ from 0.01 wt. % to 0.07 wt % $Na_2O$, and the sodium content in the first composition is lower than a sodium content in the second composition of the honeycomb body; and
    firing the green membrane layer on the honeycomb body walls to form a porous membrane layer comprising cordierite.

2. The method of claim 1, wherein the partition walls comprise CaO 0.01-0.15 wt. %; $Fe_2O_3$ 0.4-1.0 wt. %; NiO 0.001-0.01 wt. %; and $TiO_2$ 0.1-0.5 wt. %.

3. The method of claim 1, wherein at least 50 wt. % of the first composition is comprised of: $Al_2O_3$ 31-37 wt. %; $SiO_2$ 45-51 wt. %; MgO 10-16 wt. %; and ($Na_2O+K_2O$) 0.01-0.10 wt. %.

4. The method of claim 1, wherein the first composition comprises: CaO 0.05-0.15 wt. %; $Fe_2O_3$ 0.3-1.0 wt. %; NiO 0.001-0.1 wt. %; and $TiO_2$ 0.2-0.8 wt. %.

5. The method of claim 1, wherein the first composition comprises $K_2O$ 0.01-0.03 wt. %.

6. The method of claim 1, wherein the porous membrane layer has a median thickness from 5 microns to 25 microns.

7. The method of claim 1, wherein the porous membrane layer comprises pore diameters from 0.1 micron to 5 microns.

8. The method of claim 1, wherein the porous membrane layer comprises a median pore diameter D50 from 0.2 microns to 3 microns.

9. The method of claim 1, wherein the porous membrane layer has a porosity from 40% to 60%.

10. The method of claim 1, wherein the porous membrane layer further comprises alumina.

11. The method of claim 1, wherein at least 95 wt. % of the porous membrane layer comprises a cordierite crystalline phase.

12. The method of claim 1, wherein the porous membrane layer comprises a cordierite-alumina composite.

13. The method of claim 1, wherein the porous membrane layer further comprises 1 wt. % to 50 wt. % alumina.

14. The method of claim 1, wherein the green membrane layer is fired at from 1100° C. to 1300° C.

15. The method of claim 1, wherein the honeycomb body is fired prior to applying the first composition to form the green membrane layer.

16. The method of claim 1, wherein the honeycomb body is a green body upon which the first composition is applied to form the green membrane layer, and the firing step further comprises firing the green body into a ceramic honeycomb body.

17. The method of claim 16, wherein the partition walls of the fired ceramic honeycomb body are porous partition walls.

18. The method of claim 17, wherein the porous partition walls of the fired ceramic honeycomb comprise $0.001 \leq Na_2O \leq 0.10$ wt. %, or $0.001 \leq K_2O \leq 0.03$ wt. %, or $0.001 \leq Na_2O+K_2O \leq 0.13$ wt. %.

19. The method of claim 17, wherein the porous partition walls of the fired ceramic honeycomb comprise $0.001 \leq K_2O \leq 0.03$ wt. %.

20. The method of claim 1, wherein at least 50 wt. % of the porous membrane layer is comprised of: $Al_2O_3$ 31-37 wt. %, $SiO_2$ 45-51 wt. %, and MgO 10-16 wt. %.

21. The method of claim 17, wherein the porous membrane layer comprises: $Al_2O_3$ 31-37 wt. %, $SiO_2$ 45-51 wt. %, MgO 10-16 wt. %, and $0.001 \leq Na_2O \leq 0.07$ wt. %, and the porous partition walls comprise: $Al_2O_3$ 32-38 wt. %, $SiO_2$ 47-53 wt. %, MgO 10-16 wt. %, $Na_2O$ 0.01-0.10 wt. %, CaO 0.01-0.15 wt. %, $Fe_2O_3$ 0.4-1.0 wt. %, NiO 0.001-0.01 wt. %, and $TiO_2$ 0.1-0.5 wt. %.

22. The method of claim 17, wherein the porous partition walls of the fired ceramic honeycomb comprise $0.001 \leq Na_2O \leq 0.10$ wt. %.

23. The method of claim 17, wherein the porous partition walls of the fired ceramic honeycomb comprise $0.001 \leq K_2O \leq 0.03$ wt. %.

24. The method of claim 17, wherein the porous partition walls of the fired ceramic honeycomb comprise $0.001 \leq Na_2O+K_2O \leq 0.13$ wt. %.

25. The method of claim 1, wherein the porous membrane layer comprises $0.01 \leq Na_2O \leq 0.07$ wt. %.

* * * * *